(12) United States Patent
Youn et al.

(10) Patent No.: US 6,483,566 B2
(45) Date of Patent: Nov. 19, 2002

(54) LIQUID CRYSTAL DISPLAY DEVICE WITH WIDE VIEWING ANGLE

(75) Inventors: Won-Gyun Youn, Youngsangbuk-do (KR); In-Duk Song, Youngsangbuk-do (KR); In-Jae Chung, Youngsangbuk-do (KR)

(73) Assignee: LG Philips LCD, Ltd., Seoul (KR)

( * ) Notice: Subject to any disclaimer, the term of this patent is extended or adjusted under 35 U.S.C. 154(b) by 0 days.

(21) Appl. No.: 09/921,790

(22) Filed: Aug. 6, 2001

(65) Prior Publication Data

US 2002/0036743 A1 Mar. 28, 2002

(30) Foreign Application Priority Data

Aug. 7, 2000 (KR) ........................................ 2000-45636

(51) Int. Cl.[7] ............................................. G02F 1/1343
(52) U.S. Cl. ...................................................... 349/141
(58) Field of Search ......................................... 349/141

(56) References Cited

U.S. PATENT DOCUMENTS

| 5,745,207 A | * | 4/1998 | Asada et al. | ................. | 349/141 |
| 5,946,066 A | * | 8/1999 | Lee et al. | .................... | 349/141 |
| 6,137,557 A | * | 10/2000 | Hebiguchi et al. | ........... | 349/141 |

OTHER PUBLICATIONS

H. Wakemoto et al., "An Advanced In–Plane Switching Mode TFT–LCD", SID 97 Digest, pp. 929–932 (1997).

* cited by examiner

Primary Examiner—Kenneth Parker
Assistant Examiner—Viet B. Nguyen
(74) Attorney, Agent, or Firm—McKenna Long & Aldridge (57) ABSTRACT

An array substrate for use in an IPS-LCD device includes a gate electrode, a gate line, a common line, and a plurality of common electrodes that have zigzag shapes on a substrate. A gate insulation layer is formed over an entire surface of tha substrate, and an active layer and ohmic contact layers are formed in series on the gate insulation layer and over the gate electrode. Over the gate electrode and on the ohmic contact layers, source and drain electrodes are formed. At this time, a data line is formed on the gate insulation layer. A passivation layer covers an entire surface of the substrate and has a drain contact hole that expose a portion of the drain contact hole. On the passivation layer, a plurality of pixel electrodes are formed in substantially zigzag or bent shapes. These pixel electrodes correspond to the common electrodes and are spaced apart from each other. The common and pixel electrodes have a plurality of bend portions and each bend portion has an inner part that is filled with a conductive material. Since this bend portion controls a rotational direction of liquid crystal molecules, the IPS-LCD device of the present invention has a wide viewing angle and prevents the color-shift and the brightness deterioration.

26 Claims, 5 Drawing Sheets

on state

LIQUID CRYSTAL DISPLAY DEVICE WITH WIDE VIEWING ANGLE

This application claims the benefit of Korean Patent Application No. 2000-45636, filed on Aug. 7, 2000, which is hereby incorporated by reference as if fully set forth herein.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That orientational alignment can be controlled by an applied electric field. In other words, as an applied electric field changes, so does the alignment of the liquid crystal molecules. Due to the optical anisotropy, the refraction of incident light depends on the orientational alignment of the liquid crystal molecules. Thus, by properly controlling an applied electric field a desired light image can be produced.

While various types of liquid crystal display devices are known, active matrix LCDs having thin film transistors and pixel electrodes arranged in a matrix are probably the most common. This is because such active matrix LCDs can produce high quality images at reasonable cost.

Recently, liquid crystal display (LCD) devices that are light and thin and have low power consumption characteristics are used in office automation equipment and video units and the like. Driving methods for such LCDs typically include a twisted nematic (TN) mode and a super twisted nematic (STN) mode. Although TN-LCDs and STN-LCDs have been put to practical use, they have a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and a liquid crystal interposed between the upper and lower substrates.

Figure 1:
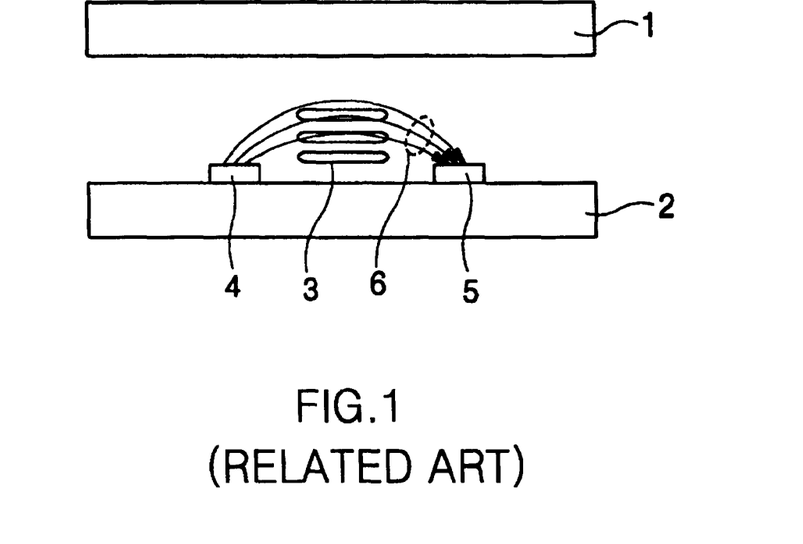
FIG. 1 is a conceptual cross sectional view illustrating a typical IPS-LCD panel.
Figure 2A:
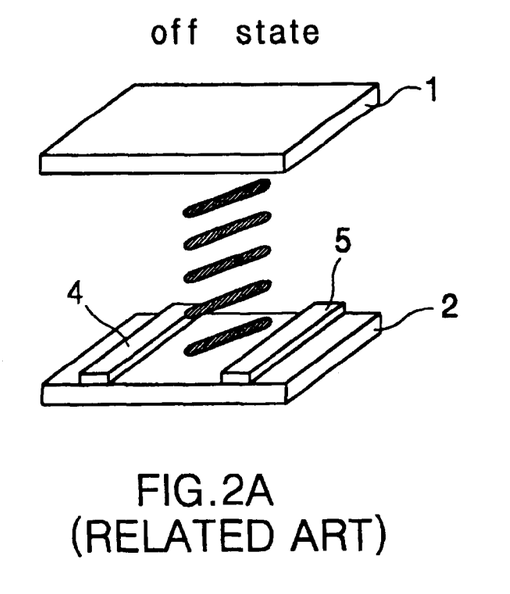
FIGS. 2A and 2B are conceptual perspective views illustrating operation modes of the conventional IPS-LCD device.
Figure 2B:
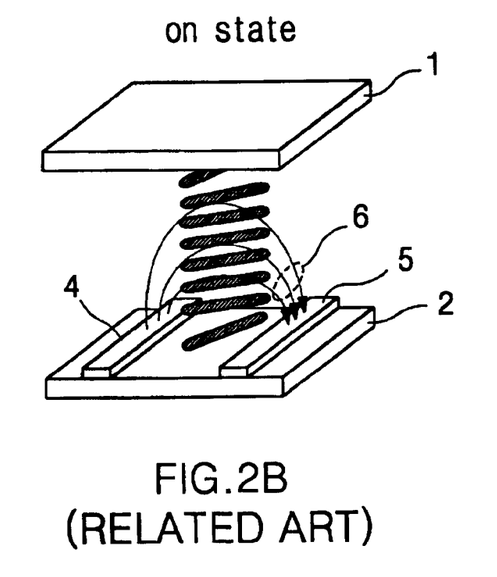
Figure 3:
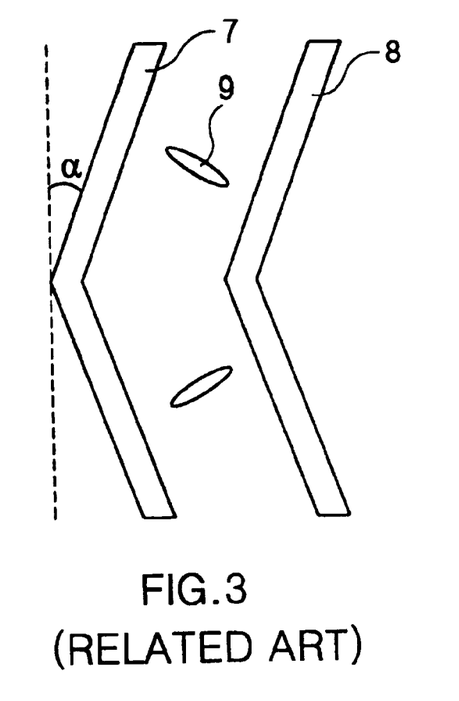
FIG. 3 is a partial plan view illustrating bend electrodes of the conventional IPS-LCD device to compensate color-shift.

A detailed explanation about operation modes of a typical IPS-LCD panel will be provided referring to FIGS. 1 to 3.

As shown in FIG. 1, upper and lower substrates 1 and 2 are spaced apart from each other, and a liquid crystal layer 3 is interposed therebetween. The upper and lower substrates 1 and 2 are called color filter substrate and array substrate, respectively. Pixel and common electrodes 4 and 5 are disposed on the lower substrate 2. The pixel and common electrodes 4 and 5 are parallel with and spaced apart from each other. The pixel and common electrodes 4 and 5 apply a horizontal electric field 6 to the liquid crystal layer 3. The liquid crystal layer 3 has a negative or positive dielectric anisotropy, and thus it is aligned parallel with or perpendicular to the horizontal electric field 6.

FIGS. 2A and 2B conceptually illustrate operation modes of a conventional IPS-LCD device. When there is no electric field between the pixel and common electrodes 4 and 5, as shown in FIG. 2A, the long axes of the liquid crystal molecules maintain an angle from a line perpendicular to the parallel pixel and common electrodes 4 and 5. Herein, the angle is 45 degrees, for example.

On the contrary, when there is an electric field between the pixel and common electrodes 4 and 5, as shown FIG. 2B, there is an in-plane horizontal electric field 6 parallel with the surface of the lower substrate 2 between the pixel and common electrodes 4 and 5. The in-plane horizontal electric field 6 is parallel with the surface of the lower substrate 2 because the pixel and common electrodes 4 and 5 are formed on the lower substrate 2. Accordingly, the liquid crystal molecules are twisted so as to align, for example, the long axes thereof with the direction of the horizontal electric field 6, thereby the liquid crystal molecules are aligned such that the long axes thereof are parallel with the line perpendicular to the pixel and common electrodes 4 and 5.

By the above-mentioned operation modes and with additional parts such as polarizers and alignment layers, the IPS-LCD device displays images. The IPS-LCD device has wide viewing angles since the pixel and common electrodes are together placed on the lower substrate. Moreover, the fabricating processes of this IPS-LCD device are simpler than those of other various LCD devices.

However in the IPS-LCD device, a color-shift which depends on the viewing angle still remains. It is already known that this color-shift is not acceptable for full color-image display. This color-shift is related to a rotational direction of the liquid crystal molecules under application of electric field when the applied voltage is greater than a threshold voltage. Moreover this color-shift is caused by increasing or decreasing of an optical retardation $\Delta n \, d$ of the liquid crystal layer with viewing angle.

For the sake of discussing the above-mentioned problem of the IPS-LCD device, with reference to FIG. 3, a specific pixel structure of the IPS-LCD device is used and will be described in detail.

As shown in FIG. 3, the pixel and common electrodes have bend angle $\alpha$. This bent electrode structure permits rotation of the liquid crystal molecules 9 in opposite directions in each pixel when voltage is supplied to the bent electrodes. Therefore, the bent electrodes and the oppositely directed liquid crystal molecules divide the pixel into two different regions with different viewing angle characteristics. And thus, the color-shift can be effectively compensated by this multi domain structure.

However, since the IPS-LCD device has the above-mentioned bent electrodes, the liquid crystal molecules around the bend portions of the bent electrodes are not properly rotated, i.e, an abnormal arrangement, when the voltage is supplied to the electrodes. Namely, the liquid crystal molecules, which are arranged parallel with the horizontal electric field when the voltage is applied, are disordered in the boundary between two domains because of these bent electrodes. Therefore, light cannot appropriately pass through this portion of the liquid crystal layer, and thus the brightness is lowered.

SUMMARY OF THE INVENTION

Accordingly, the present invention is directed to an IPS-LCD device that substantially obviates one or more of the problems due to limitations and disadvantages of the related art.

An object of the present invention is to provide an array substrate for use in an IPS-LCD device which depresses a color-shift.

Another object of the present invention is to provide an array substrate for use in an IPS-LCD device which prevents a deterioration of the brightness.

In order to achieve the above object, the first preferred embodiment of the present invention provides an array substrate for use in an in-plane switching liquid crystal display device including a gate line on a substrate; a data line over the substrate, the data line being perpendicular to the gate line; a common line on the substrate, the common line being parallel with and spaced apart from the gate line; a plurality of common electrodes extended from the common line, wherein each common electrode has a plurality of bend portions, and wherein each inner part of the bend portions is filled with a conductive material; a plurality of pixel electrodes spaced apart from the common electrodes, wherein each pixel electrode has a plurality of bend portions and corresponds to each common electrode; and a switching element electrically connected to the gate and data lines, the switching element supplying voltage to the pixel electrodes.

The present invention also provides, in another aspect, an array substrate for use in an in-plane switching liquid crystal display device including a gate line on a substrate; a data line over the substrate, the data line being perpendicular to the gate line; a common line on the substrate, the common line being parallel with and spaced apart from the gate line; a plurality of common electrodes extended from the common line, wherein each common electrode has a plurality of bend portions; a plurality of pixel electrodes spaced apart from the common electrodes, wherein each pixel electrode has a plurality of bend portions and corresponds to each common electrode, and wherein each inner part of the bend portions is filled with a conductive material; and a switching element electrically connected to the gate and data lines, the switching element supplying voltage to the pixel electrodes.

The present invention also provides, in another aspect, an array substrate for use in an in-plane switching liquid crystal display device including a gate line on a substrate; a data line over the substrate, the data line being perpendicular to the gate line; a common line on the substrate, the common line being parallel with and spaced apart from the gate line; a plurality of common electrodes extended from the common line, wherein each common electrode has a plurality of bend portions, and wherein each inner part of the bend portions is filled with a conductive material; a plurality of pixel electrodes spaced apart from the common electrodes, wherein each pixel electrode has a plurality of bend portions and corresponds to each common electrode, and wherein each inner part of the bend portions is filled with a conductive material; and a switching element electrically connected to the gate and data lines, the switching element supplying voltage to the pixel electrodes.

A side of each common electrode forms an angle $\beta$ with a line extended from a side of the inner part of the bend portion, wherein the side of the each common electrode forms an angle $\ominus$ with a vertical line that is parallel with the data line, wherein the angle $\beta$ is greater than 0°, and wherein the angle $\beta$ is less than or equal to the angle $\ominus$.

A side of each pixel electrode forms an angle $\beta$ with a line extended from a side of the inner part of the bend portion, wherein the side of the each pixel electrode forms an angle $\ominus$ with a vertical line that is parallel with the data line, wherein the angle $\beta$ is greater than 0°, and wherein the angle $\beta$ is less than or equal to the angle $\ominus$.

The present invention also provides, in another aspect, an array substrate for use in an in-plane switching liquid crystal display device including a gate line on a substrate; a data line over the substrate, the data line being perpendicular to the gate line; a common line on the substrate, the common line being parallel with and spaced apart from the gate line; a plurality of common electrodes extended from the common line, wherein each common electrode has a plurality of bend portions, and wherein each inner part of the bend portions has a round shape; a plurality of pixel electrodes spaced apart from the common electrodes, wherein each pixel electrode has a plurality of bend portions and corresponds to each common electrode; and a switching element electrically connected to the gate and data lines, the switching element supplying voltage to the pixel electrodes.

The present invention also provides, in another aspect, an array substrate for use in an in-plane switching liquid crystal display device including a gate line on a substrate; a data line over the substrate, the data line being perpendicular to the gate line; a common line on the substrate, the common line being parallel with and spaced apart from the gate line; a plurality of common electrodes extended from the common line, wherein each common electrode has a plurality of bend portions, and wherein each inner part of the bend portions has a round shape; a plurality of pixel electrodes spaced apart from the common electrodes, wherein each pixel electrode has a plurality of bend portions and corresponds to each common electrode; and a switching element electrically connected to the gate and data lines, the switching element supplying voltage to the pixel electrodes.

The present invention also provides, in another aspect, an array substrate for use in an in-plane switching liquid crystal display device including a gate line on a substrate; a data line over the substrate, the data line being perpendicular to the gate line; a common line on the substrate, the common line being parallel with and spaced apart from the gate line; a plurality of common electrodes extended from the common line, wherein each common electrode has a plurality of bend portions, and wherein each inner part of the bend portions has a round shape; a plurality of pixel electrodes spaced apart from the common electrodes, wherein each pixel electrode has a plurality of bend portions and corresponds to each common electrode, and wherein each inner part of the bend portions has a round shape; and a switching element electrically connected to the gate and data lines, the switching element supplying voltage to the pixel electrodes.

The round shape of each bend portion satisfies a condition defined by a diameter of a circle that is abutted on an arc of the said round shape.

The diameter beneficially ranges from 7 $\mu$m to 170 $\mu$m.

The diameter also ranges from 30 $\mu$m to 170 $\mu$m.

The diameter also ranges from 70 $\mu$m to 100 $\mu$m.

Each outer part of the bend portions of the said common electrodes has a round shape, and each outer part of the bend portions of the said pixel electrodes also has a round shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
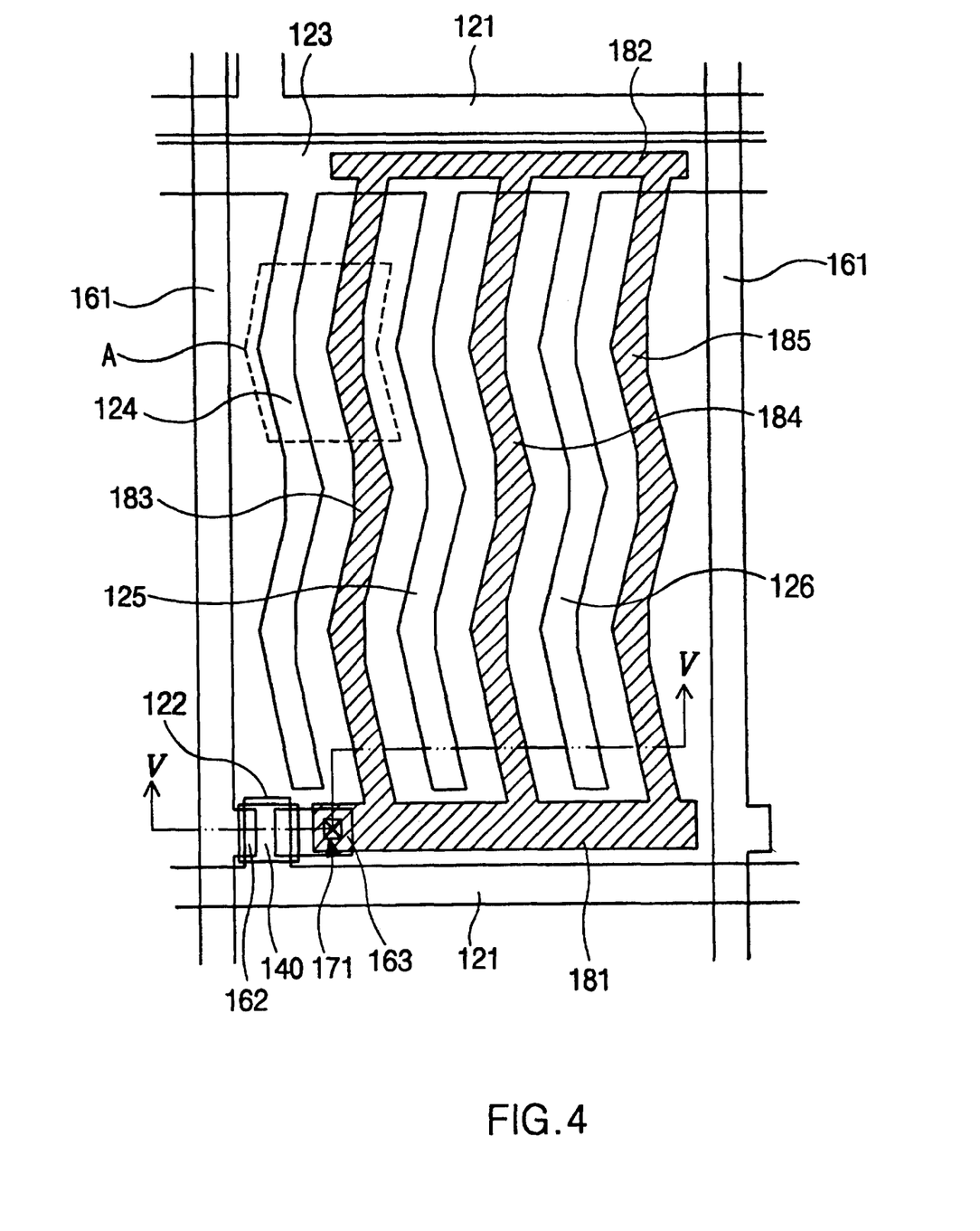
FIG. 4 is a plan view illustrating a pixel of an array substrate of an IPS-LCD device according to a preferred embodiment of the present invention.
Figure 5:
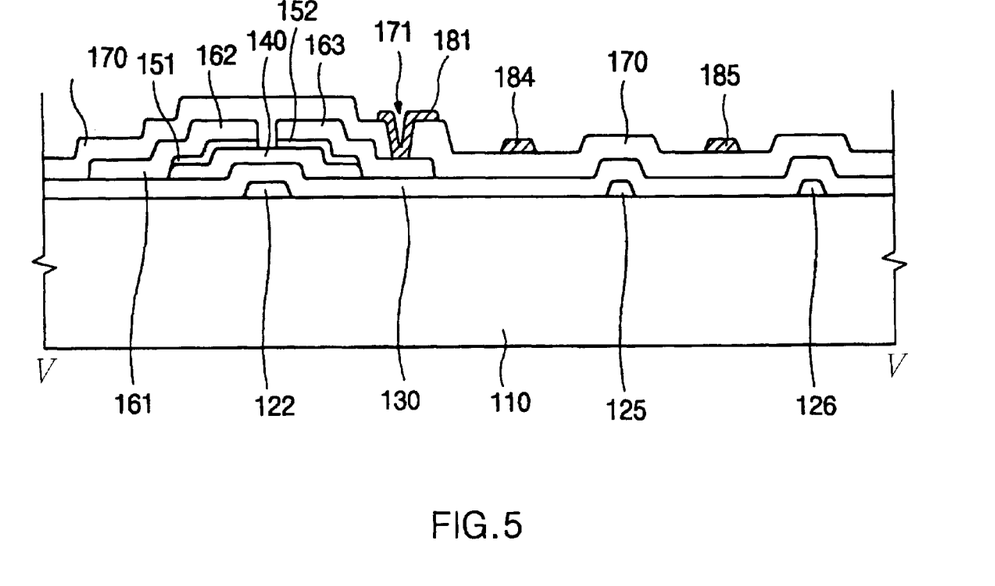
FIG. 5 is a cross-sectional view taken along line V—V of FIG. 4.

FIG. 4 is a plan view of an array substrate of an IPS-LCD device according to a first preferred embodiment of the present invention, and FIG. 5 is a cross-sectional view taken along line V—V of FIG. 4.

As shown in FIG. 4, a gate line 121 is transversely disposed on a substrate 110. A common line 123 is spaced apart from the gate line 121 and disposed parallel with the gate line 121. A plurality of data lines 161 that are spaced apart from each other are disposed across and perpendicular to the gate and the common lines 121 and 123.

Near the crossing of the gate and data lines 121 and 161, gate and source electrodes 122 and 162 are positioned and electrically connected with the gate and data lines 121 and 161, respectively. A drain electrode 163 is spaced apart from the source electrode 162 and overlaps one portion of the gate electrode 122. The source electrode 162 also overlaps another portion of the gate electrode 122. An active layer is located over the gate electrode 122 and between the source and drain electrodes 162 and 163.

A first connecting line 181 electrically contacts the drain electrode 163 through a drain contact hole 171, and is disposed parallel with the gate line 121. A plurality of pixel electrodes 183, 184 and 185 are disposed in substantially zigzag shapes roughly perpendicular to the first connecting line 181, and communicate with the first connecting line 181. Ends of the pixel electrodes 183, 184 and 185 are connected with a second connecting line 182 that is over a portion of the common line 123. The second connecting line 182 and the common line 123 comprise a storage capacitor.

A plurality of common electrodes 124, 125 and 126 that have substantially zigzag shapes are disposed substantially parallel with the pixel electrodes 183, 184 and 185, and electrically contact the common line 123. Each common electrode 124, 125 or 126 is spaced apart from the adjacent pixel electrodes 183, 184 and 185. One end of each of the common electrodes is electrically connected to the common line 123. Although FIG. 4 shows only three common electrodes and three pixel electrodes, the number of the common and pixel electrodes depends on a space between electrodes and on an oblique angle of each electrode.

The common line 123, the gate and data lines 121 and 161, and the common electrodes 124, 125 and 126 are an opaque metal, while the pixel electrodes 183, 184 and 185, and the first and second connecting lines 181 and 182 are a transparent conductive material. Preferably, the opaque metal is selected from a group consisting of chromium (Cr), aluminum (Al), aluminum alloy (Al alloy), molybdenum (Mo), tantalum (Ta), tungsten (W), and antimony (Sb), and the like, while the transparent conductive material is indium tin oxide (ITO) or indium zinc oxide (IZO). However, the common line 123 and the common electrodes 124, 125 and 126 can be the transparent conductive material. Although not depicted in FIG. 4, the gate line 121, the gate electrode 122, the common line 123, and the common electrodes 124, 125 and 126 are covered up with a gate insulation layer (see reference element 130 of FIG. 5) that is formed of silicon nitride ($SiN_x$) or silicon oxide ($SiO_2$).

Now, referring to FIG. 5, a fabricating process for the array substrate shown in FIG. 4 is provided. The gate electrode 122 and the common electrodes 125 and 126 are formed on the substrate 110. The gate line 121 of FIG. 4 is formed with the gate electrode 121 in the same layer, and thus the gate electrode 122 extends from the gate line 121. If the gate electrode 122 and the common electrodes 125 and 126 are different materials, they are formed in different steps. Moreover, the common line 123 of FIG. 4 is formed with the common electrodes 125 and 126 in the same layer, and thus these common electrodes 125 and 126 that have substantially zigzag shapes extend from the common line 123. After that, a gate insulation layer 130 is formed on the substrate 110 to cover the gate electrode 122 and common electrodes 125 and 126. As mentioned before, the gate insulation layer 130 is silicon nitride ($SiN_x$) or silicon oxide ($SiO_2$). Subsequently, an active layer 140 is formed on the gate insulation layer 130, particularly over the gate electrode 122. Ohmic contact layers 151 and 152 are formed on the active layer 140, and thus the ohmic contact layers 151 and 152 are interposed between the active layer 140 and the source and drain electrodes, which are formed in a later step. The active layer 140 includes an amorphous silicon layer (a-Si), while the ohmic contact layers 151 and 152 include a doped amorphous silicon layer (n+a-Si).

The source and drain electrodes 162 and 163 are formed on the ohmic contact layers 151 and 151, respectively, and on the gate insulation layer 130. Those source and drain electrodes 162 and 163 are made of the same material as the gate electrode 122. At this point, the data line 161 is formed together with the source electrode 162 such that the data line 161 is connected to the source electrode 162. The source and drain electrodes 162 and 163 are spaced apart from each other and respectively overlap different portions of the gate electrode 122.

Thereafter, a passivation layer 170 is deposited over the entire surface of the substrate 110, and then patterned to form the drain contact hole 171 that exposes a portion of the drain electrode 163. The passivation layer 170 is made of silicon nitride ($SiN_x$) or silicon oxide ($SiO_2$). Next, the first connecting line 181, which contacts the drain electrode 163 through the drain contact hole 171, is formed on the passivation layer 170. At this time, the second connecting line 182 of FIG. 4 and the pixel electrodes 184 and 185 are simultaneously formed. These pixel electrodes 184 and 185 have substantially zigzag shapes and are substantially parallel with the common electrodes 125 and 126, as shown in FIG. 4. Again, the pixel electrodes 184 and 185 connect the first connecting line 181 to the second connecting line 182 (see FIG. 4). Although the first and second connecting lines 181 and 182, and the pixel electrodes 183, 184 and 185 are made of the transparent conductive material, such as ITO and IZO, in this embodiment, they can be made of an opaque conductive material.

Subsequently, although not shown in FIG. 5, an orientation film of polyimide or photoalignment material is formed on the pixel electrodes and rubbed by a fabric or patterned by light.

Figure 6:
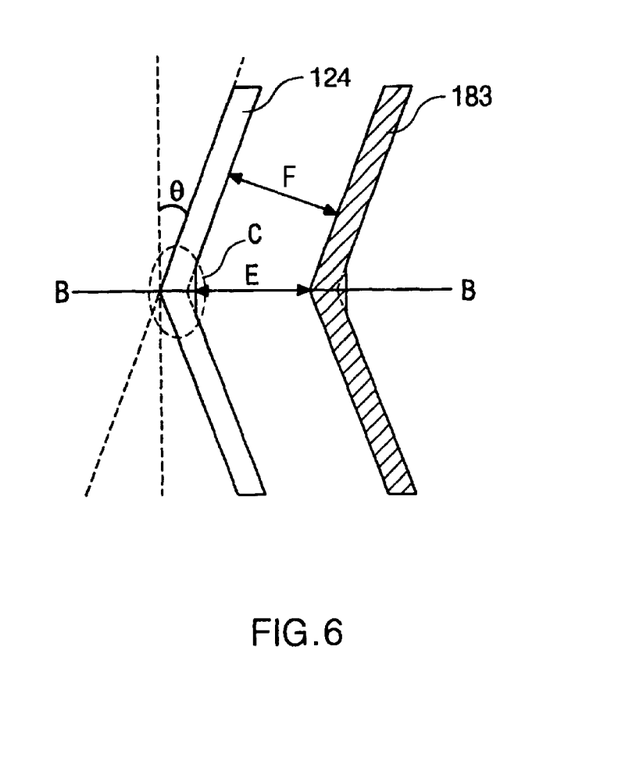
FIG. 6 is an enlarged plan view of a portion "A" of FIG. 4.
Figure 7A:
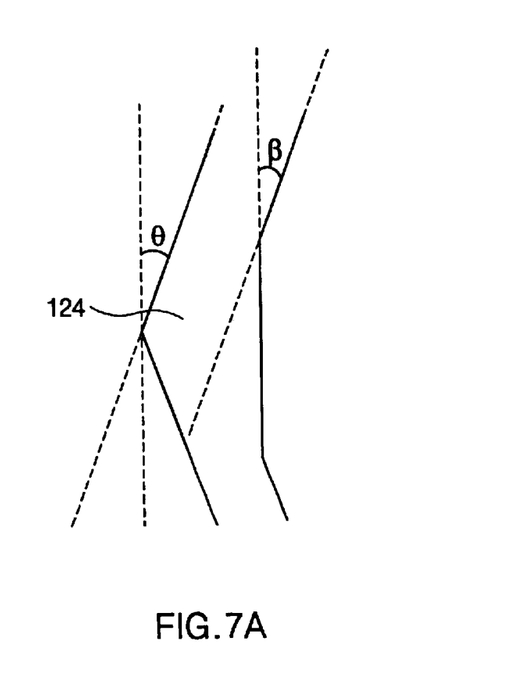
FIGS. 7A and 7B are an enlarged views of a portion "C" of FIG. 6 and illustrate the preferred embodiments, respectively.
Figure 7B:
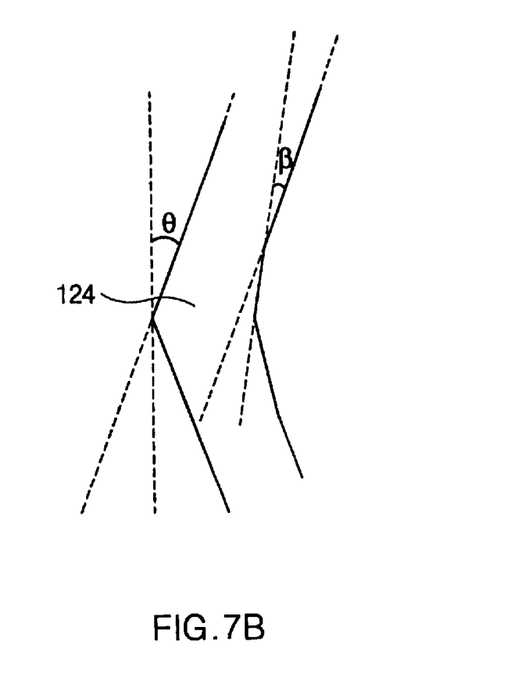

FIG. 6 is an enlarged plan view of a portion "A" of FIG. 4. FIGS. 7A and 7B are enlarged views of a portion "C" of FIG. 6 and respectively illustrate the preferred embodiments.

As shown in FIG. 6, the common electrode 124 and the pixel electrode 183 have substantially zigzag shapes with bend portions. A line B—B is a boundary between two domains of the liquid crystal molecules, and these two domains are symmetric with respect to the line B—B. Each electrode forms a bend angle Θ with a vertical line that is perpendicular to the line B—B.

Still referring to FIG. 6, an interior angle of each bend portion of the common and pixel electrodes 124 and 183 is not a sharp angle and is filled with a conductive material. From this structure of FIG. 6, the common and pixel electrodes in the bend portion are closer than they are in the domain portion. Namely, a distance "E" between the bend portions is narrower than a distance "F" between portions of the electrodes away from the bend portions. And thus, an increase in the intensity of the electric field around the bend portions of the electrodes when the voltage is applied to the common and pixel electrodes is prevented.

Referring to FIGS. 7A and 7B, a degree of filling an inner part of the bend portion is depends on an angle ∃ which is measured between a side of the electrode 124 and a line extended from a side of the filled inner part. As shown in FIG. 7A, the angle ∃ can be equal to the above-mentioned angle 1 that is measured between a vertical line parallel with the data line and the side of the electrode 124. Moreover, as shown in FIG. 7B, the angle ∃ can be smaller than the angle 1. If the angle 1 is 0°, the common and pixel electrodes have a conventional structure. If the angle ∃ is greater than the angel 1, the rotational direction of the liquid crystal molecules in the bend portion is different from that of the liquid crystal molecules in the domain portion. Accordingly, the angle ⌐ is beneficially greater than 0° and less than or equal to the angel 1 (i.e., 0°<∃≦1).

Figure 8:
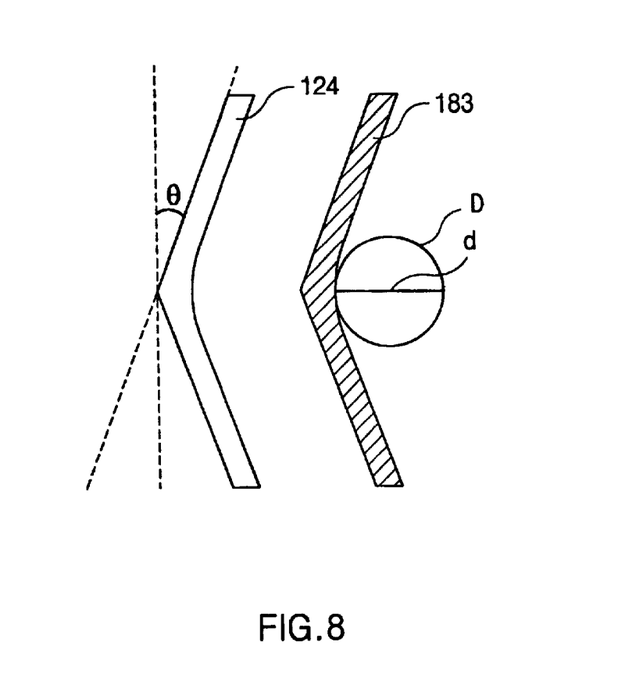
FIG. 8 is an enlarged plan view illustrating pixel and common electrodes according to another preferred embodiment.

FIG. 8 is an enlarged plan view illustrating pixel and common electrodes according to another preferred embodiment. As shown, the inner part of each bend portion of the common and pixel electrodes 124 and 183 has a curved line, i.e, a round or curved shape. The common and pixel electrodes 124 and 183 form the angle 1 with the vertical line that is parallel with the data line (see reference element 161 of FIG. 4). The round shape of the bend portion in the common and pixel electrodes is measured in terms of an arc of a hypothetical circle "D" formed adjacent to the bend portion of the respective electrode. A degree of deflection of the electrode is indicated by a diameter "d" of the circle "D" that is adjacent to the inner part of the bend portion. Moreover, the diameter "d" of a circle "D" is related to the angle 1. As described before, the angle 1 beneficially ranges from 5° to 25°. At this point, the diameter "d" ranges from 7 μm to 170 μm. Moreover, the diameter "d" can vary depending on the aperture ratio and on the electric field. When the diameter "d" ranges from 70 μm to 100 μm, the driving voltage decreases and the area deteriorating the brightness is at a minimum, i.e., an optimum mode. In general, the diameter "d" ranging from 30 μm to 170 μm is employed.

According to the principles of the present invention, by filling the inner part of the bend portion with the conductive material or by forming the curved line in the inner part of the bend portion, the area reduced brightness is minimized. However, an outer part of the bend portion can be curvilinear. Namely, the exterior angles of the common and pixel electrodes can be rounded off. At this point, the phenomenom by which the electric field is intensified is decreased around the bend portions because the common and pixel electrodes have round shapes in the bend portions. Therefore, multiple domains are easily achieved, and the decrease in the brightness is suppressed.

As described above, since the inner part of the bend portion is filled or is rounded when using substantially zigzag-shaped common and pixel electrodes, the rotational direction of the liquid crystal molecules around the bend portion is controlled. And thus, the decrease of the brightness is lowered, the liquid crystal molecules are easily oriented, and the multi-domain orientation is achieved.

It will be apparent to those skilled in the art that various modifications and variations can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. An array substrate for use in a liquid crystal display device comprising:

a gate line on a substrate;

a data line over the substrate, the data line being perpendicular to the gate line;

a common line on the substrate, the common line being parallel with and spaced apart from the gate line;

a plurality of pixel electrodes spaced apart from the generally along the common electrodes, wherein each pixel electrode has a plurality of bend portions corresponding to each of the plurality of bend portions of a respective common electrode; and a switching element electrically connected to the gate and data lines, the switching element supplying voltage to the said pixel electrodes.

2. The array substrate according to claim 1, wherein a side of each common electrode forms an angle ∃ with a line extended from a side of the inner region of the bend portion, wherein the side of the each common electrode forms an angle 1 with a vertical line that is parallel with the data line, wherein the angle ∃ is greater than 0°, and wherein the angle ∃ is less than or equal to the angle 1.

3. An array substrate for use in a liquid crystal display device comprising:

a gate line on a substrate;

a data line over the substrate, the data line being perpendicular to the gate line;

a common line on the substrate, the common line being parallel with and spaced apart from the gate line;

a plurality of common electrodes extending from the common line, wherein each common electrode has a plurality of bend portions;

a plurality of pixel electrodes spaced apart from and elongated along the said common electrodes, wherein each pixel electrode has a plurality of bend portions each having an inner region and corresponding to each of the plurality of bend portions of a respective common electrode, and wherein each inner region is filled with a conductive material; and a switching element electrically connected to the gate and data lines, the switching element supplying voltage to the pixel electrodes.

4. The array substrate according to claim 3, wherein a side of each pixel electrode forms an angle ∃ with a line extended from a side of the inner region of the bend portion of the pixel electrode, wherein the side of the each pixel electrode forms an angle 1 with a vertical line that is parallel with the data line, wherein the angle ∃ is greater than 0°, and wherein the angle ∃ is less than or equal to the angle 1.

5. An array substrate for use in a liquid crystal display device comprising:
   a gate line on a substrate;
   a data line over the substrate, the data line being perpendicular to the gate line;
   a common line on the substrate, the common line being parallel with and spaced apart from the gate line;
   a plurality of common electrodes extending from the common line, wherein each common electrode has a plurality of bend portions each having an inner region, and wherein each inner region of each common electrode is filled with a conductive material;
   a plurality of pixel electrodes spaced apart from the common electrodes, wherein each pixel electrode has a plurality of bend portions each having an inner region and corresponding to each of the plurality of bend portions of a respective common electrode, and wherein each inner region of each pixel electrode is filled with a conductive material; and
   a switching element electrically connected to the gate and data lines, the switching element supplying voltage to the pixel electrodes.

6. The array substrate according to claim 5, wherein a side of each common electrode forms an angle ∃ with a line extended from a side of the inner region of the bend portion of the common electrode, wherein the side of the each common electrode forms an angle 1 with a vertical line that is parallel with the data line, wherein the angle ∃ is greater than 0°, and wherein the angle ∃ is less than or equal to the angle 1.

7. The array substrate according to claim 5, wherein a side of each pixel electrode forms an angle ∃ with a line extended from a side of the inner region of the bend portion of the pixel electrode, wherein the side of the each pixel electrode forms an angle 1 with a vertical line that is parallel with the data line, wherein the angle ∃ is greater than 0°, and wherein the angle ∃ is less than or equal to the angle 1.

8. An array substrate for use in a liquid crystal display device comprising:
   a gate line on a substrate;
   a data line over the substrate, the data line being perpendicular to the gate line;
   a common line on the substrate, the common line being parallel with and spaced apart from the gate line;
   a plurality of common electrodes extended from the common line, wherein each common electrode has a plurality of bend portions each having an inner region, and wherein each inner region has a round shape;
   a plurality of pixel electrodes spaced apart from and elongated along the said common electrodes, wherein each pixel electrode has a plurality of bend portions corresponding to each of the plurality of bend portions of a respective common electrode; and
   a switching element electrically connected to the gate and data lines, the switching element supplying voltage to the pixel electrodes.

9. The array substrate according to claim 8, wherein the round shape of each bend portion satisfies a condition defined by a diameter of a circle that is abutted on an arc of the round shape.

10. The array substrate according to claim 9, wherein the diameter ranges from 7 µm to 170 µm.

11. The array substrate according to claim 9, wherein the diameter ranges from 30 µm to 170 µm.

12. The array substrate according to claim 9, wherein the diameter ranges from 70 µm to 100 µm.

13. The array substrate according to claim 8, wherein each of the plurality bend portions of the said common electrodes has an outer part having a round shape.

14. An array substrate for use in an liquid crystal display device comprising:
   a gate line on a substrate;
   a data line over the substrate, the data line being perpendicular to the gate line;
   a common line on the substrate, the common line being parallel with and spaced apart from the gate line;
   a plurality of common electrodes extended from the common line and elongated along the data line, wherein each common electrode has a plurality of bend portions;
   a plurality of pixel electrodes spaced apart from and elongated along the common electrodes, wherein each pixel electrode has a plurality of bend portions each having an inner region and corresponding to each of the plurality of bend portion of a respective common electrode, and wherein each inner region has a round shape; and
   a switching element electrically connected to the gate and data lines, the switching element supplying voltage to the said pixel electrodes.

15. The array substrate according to claim 14, wherein the round shape of each bend portion satisfies a condition defined by a diameter of a circle that is abutted on an arc of the round shape.

16. The array substrate according to claim 15, wherein the diameter ranges from 7 µm to 170 µm.

17. The array substrate according to claim 15, wherein the diameter ranges from 30 µm to 170 µm.

18. The array substrate according to claim 15, wherein the diameter ranges from 70 µm to 100 µm.

19. The array substrate according to claim 14, wherein each outer region of the bend portions of the said pixel electrodes has a round shape.

20. An array substrate for use in an liquid crystal display device comprising:
   a gate line on a substrate;
   a data line over the substrate, the data line being perpendicular to the gate line;
   a common line on the substrate, the common line being parallel with and spaced apart from the gate line;
   a plurality of common electrodes extended from the common line and elongated along the data line, wherein each common electrode has a plurality of bend portions each having an inner region, and wherein each inner region of the common electrode has a round shape;
   a plurality of pixel electrodes spaced apart from and elongated along the common electrodes, wherein each pixel electrode has a plurality of bend portions having an inner region and corresponding to each of the plurality of bend portions of a respective common electrode, and wherein each inner region of the pixel electrode has a round shape; and a switching element electrically connected to the gate and data lines, the switching element supplying voltage to the pixel electrodes.

21. The array substrate according to claim 20, wherein the round shape of each bend portion satisfies a condition defined by a diameter of a circle that is abutted on an arc of the round shape.

22. The array substrate according to claim 21, wherein the diameter ranges from 7 $\mu$m to 170 $\mu$m.

23. The array substrate according to claim 21, wherein the diameter ranges from 30 $\mu$m to 170 $\mu$m.

24. The array substrate according to claim 21, wherein the diameter ranges from 70 $\mu$m to 100 $\mu$m.

25. The array substrate according to claim 20, wherein each outer region of the bend portions of the common electrodes has a round shape.

26. The array substrate according to claim 20, wherein each outer region of the bend portions of the pixel electrodes has a round shape.

* * * * *